United States Patent Office 2,862,899
Patented Dec. 2, 1958

2,862,899

COMPOSITIONS OF POLYMERS OF PERHALOGENATED OLEFINS AND WAX

Fred William West, Paterson, N. J., assignor, by mesne assignments, to Minnesota Mining and Manufacturing Company, St. Paul, Minn., a corporation of Delaware No Drawing. Application March 29, 1955
Serial No. 497,815

17 Claims. (Cl. 260—28.5)

This invention relates to a new and useful composition containing a polymer of a perhalogenated olefin and a method for the preparation of such a composition. In one aspect this invention relates to a new and useful protective coating containing a low molecular weight polymer of trifluorochloroethylene. In a more particular aspect, the present invention relates to a new coating composition which is useful as a polish and which contains a normally liquid polymer of trifluorochloroethylene as one component and a wax having a melting point of at least 60° C. as a second component.

Wax-containing compositions which are primarily utilized as polishes are not new. Such compositions require components which form a hard glossy surface upon drying and rubbing. However, many such wax-containing compositions lack a combination of certain desirable properties. For example, many wax-containing polish compositions are difficultly rubbed out to a smooth film, and require vigorous rubbing to obtain a medium to high gloss. Others lack a high degree of resistance to moisture and are not sufficiently water repellent to make them suitable water resistant protective coatings on wood, metal and other surfaces. One great disadvantage of many commercial wax-containing polishes, and especially those which possess some degree of water repellency, is that it is very difficult to remove the polish completely from the surface to which it has been applied. This is particularly detrimental when the polished surfaces are to be repainted inasmuch as such polishes are not miscible with ordinary commercial paints and must, therefore, be completely removed before application of the paint. In order to remove such polishes from surfaces to which they have been applied, the surfaces must first be cleaned with a suitable solvent followed by buffing or sanding, reapplication of the solvent, etc., until the polish has been completely removed. This is not only time consuming but inefficient. In addition, many of the polishes are not durable or stable over long periods of time and tend to streak, lose lustre, and become sticky and very difficult to remove after prolonged exposure to strong sunlight, heat or cold.

An object of the present invention is to provide a new and improved wax-containing composition.

Another object of the present invention is to provide a wax-containing polish which is easily and quickly applied and rubbed out to a smooth film and which renders a high gloss to the surface to which it is applied.

Another object is to provide a new and improved wax-containing composition having a high degree of moisture resistance and which is water repellent and not spotted by water.

Another object of the present invention is to provide a new and improved wax-containing polish which renders a surface smooth and non-tacky thereby enabling such a polished surface to be more easily wiped free of dirt and dust.

A further object is to provide a wax-containing polish possessing the above mentioned desirable characteristics and which retains its stability and durability when exposed to sunlight, heat and cold, and which is easily removed even after exposure to such conditions.

A still further object is to provide a new and improved polish composition which when applied to a surface does not have to be removed completely before the surface is repainted.

A still further object is to provide a new and improved polish composition which is easily manufactured.

Various other objects and advantages of the present invention will become apparent to those skilled in the art from the accompanying description and disclosure.

Accordingly, the present invention relates to a composition comprising an admixture of a polymer of a perhalogenated olefin, such as trifluorochloroethylene, having a melting point below 40° C. as one component and a wax base such as a natural wax or an oxidized microcrystalline petroleum wax as a second component, the wax base having a melting point of at least 60° C. The polymers of trifluorochloroethylene use as one component of the composition of the present invention are the normally liquid and soft wax-like polymers produced by thermal cracking of high molecular weight polytrifluorochloroethylene and by telomerization of trifluorochloroethylene. In general, the polymeric trifluorochloroethylene component boils between about 90° C. and about 250° C. at 1 mm. mercury pressure and has a kinematic viscosity value at 210° F. of between about 2 centistokes and about 50 centistokes. Of these polymers of trifluorochloroethylene, the normally liquid polymers are those boiling below 210° C. at 1 mm. mercury pressure and the soft waxy materials are those which boil between about 200° C. and about 250° C. at 1 mm. mercury pressure and melt between about 30° C. and about 40° C. The wax base component which is preferably used as a second component in the composition of the present invention is a hard wax and may be a hard natural wax or oxidized microcrystalline petroleum wax. The term hard wax as used herein is defined as a wax which has an Asphalt Needle Penetration Value of less than 0.1 centimeter. In general, the hard waxes so defined have a melting point above 70° C. The natural wax or oxidized microcrystalline petroleum wax component and the liquid or soft waxy polymer of trifluorochloroethylene are used in admixture with or without the addition of solvent, diluent or other vehicle, and may be used in the form of a paste, a liquid, a dispersion and an aqueous emulsion and may be of the abrasive or non-abrasive type. Such compositions are particularly useful as polishes for resin, leather, metal and wood surfaces including enamel or painted surfaces, such as automobiles, floors, furniture, linoleum, stoves and the like.

The proportions of the halogenated polymeric component and the non-halogenated wax base component used in accordance with the present invention may vary over relatively wide limits and, in general, will depend upon the specific application of the composition. For example, the weight ratio of the polymer of trifluorochloroethylene component to the non-halogenated wax base may range between about 1:10 and about 10:1, the preferred weight ratio depending upon whether or not a solvent is used and whether or not a paste or liquid type polish is desired. An excess of the oil or soft wax polymer of trifluorochloroethylene is generally employed in the composition in which no solvent is used in order to obtain a homogeneous blend of the components. In the composition which does not contain a solvent component, the weight ratio of halogenated polymeric component to non-halogenated wax component is between about 1:1 and 10:1 and preferably between about 1:1 and 2:1.

In the paste and liquid types of compositions in which a solvent is used as a component, the weight ratio of polymer component to wax base component ranges between about 1:1 to 1:10 and preferably ranges between about 1:1 and 1:5.

It has been found that the presently described polish composition containing a low molecular weight polymer of trifluorochloroethylene (i. e., a polymer having a molecular weight of less than 10,000) and a natural wax, for example, possesses greatly improved properties as compared to a polish composition which does not contain such a polymer of trifluorochloroethylene. It also has been found that the polymers of trifluorochloroethylene used in accordance with the present invention are incompatible with the natural wax and oxidized microcrystalline petroleum wax component, which incompatibility prevents a softening of the nonfluorine-containing wax component by the fluorine-containing polymer component. Instead of a softening effect, the fluorine-containing polymeric component tends to lubricate the nonfluorinated component of the presently described composition and thus the polish can be applied to a surface using a minimum of effort and can be rubbed out to a smooth, and non-tacky film without the formation of streaks. In many instances a simple wiping action of the polished surface is sufficient to produce a glossy and smooth finish. The polish composition of the present invention possesses a high degree of resistance to moisture, is very durable and does not rapidly decompose, lose lustre, gum or stick when exposed to severe weathering conditions over long periods of time. The polish is resistant to change by strong sunlight and extreme temperatures. Due to the stability of the polish composition of the present invention, it is essentially as easily removed after long periods of time as it is after it has been applied. The application of a solvent is all that is needed to completely remove the polish. When it is necessary to repaint over a surface on which this polish has been used, it is not even necessary to completely remove the polish from the surface before the surface is repainted. It has been found that the composition of the present invention is at least partially miscible with ordinary commercial paints and thinners. In other words, a surface which has been polished with the composition of the present invention need not be sanded or buffed or thoroughly cleaned with a solvent prior to application of a paint. The paints are capable of wetting the polish and thus the particles of paint can "migrate" through the film of polish to the surface which is to be repainted.

As stated above, the polymers of trifluorochloroethylene which are utilized in accordance with the present invention are those having a melting point below 40° C. and include the normally liquid and soft waxy polymers having a molecular weight of less than 10,000. Such polymers are prepared by a variety of procedures including thermal cracking of high molecular weight polymers of trifluorochloroethylene, fluorination of thermally cracked material of polytrifluorochloroethylene; or polymerization of trifluorochloroethylene in the presence of a chain transfer agent or telogen to produce the low molecular weight polymer directly.

The thermal cracking of high molecular weight solid polytrifluorochloroethylene (i. e., polytrifluorochloroethylene having a molecular weight above 50,000) to produce lower molecular weight materials in the oil and wax range is well known. For example, solid polytrifluorochloroethylene may be cracked at temperatures between about 330° C. and about 400° C. at cracking times ranging from 10 seconds to about 20 hours. The cracking may take place in a semi-batchwise manner as, for example, in an autoclave, or continuously in a cracking coil. The cracked material is then fractionated, if desired, into various fractions by distillation under subatmospheric pressures. The cracked oils and soft waxes obtained by this procedure may be stabilized by fluorination with a metal fluoride such as cobalt trifluoride, or other suitable fluorinating agents such as chlorine trifluoride, to produce oils and soft waxes which are also useful as a component of the composition of the present invention. The thermal cracking of high molecular weight solid polytrifluorochloroethylene involves successive cleavages of the polymer chain with the result that the cracked material contains points of unsaturation. Ordinarily, the unsaturation is in a terminal position and thus the unsaturated products of the thermal cracking are usually either monoolefins or diolefins. The stabilization of the thermally cracked material by fluorination may involve addition of fluorine to the points of unsaturation in the thermally cracked products and/or replacement of chlorine with fluorine. The products so obtained by thermal cracking of the high molecular weight polytrifluorochloroethylene contain fluorinated end groups and are mixtures of compounds having even or odd numbers of carbon atoms, the fluorinated products being stable and essentially free of unsaturation. The products obtained by these procedures which are used as one component of the composition of the present invention are the fluorinated thermally cracked products boiling in general, within the range of about 90° C. to about 230° C. at 1 mm. mercury pressure and having an average molecular weight less than 2,000 and are preferably the less volatile normally liquid oils boiling between about 100° C. and about 210° C. at 1 mm. mercury pressure. A more detailed description of cracking and fluorination conditions may be found in U. S. Patent No. 2,636,907, issued April 28, 1953.

In addition to the methods above-described for producing the liquid and soft waxy polymers of trifluorochloroethylene which are used as one constituent of the wax-containing compositions of the present invention, the polymers also are obtained by a direct procedure involving polymerization of trifluorochloroethylene in the presence of a promoter, such as benzoyl peroxide, at a temperature ranging between about 75° C. and about 210° C. and in the presence of a nonpolymerizable chlorinated aliphatic hydrocarbon as a chain transfer solvent, or in the presence of a telogen such as a sulfuryl halide with or without the addition of sulfur dioxide. When employing a chain transfer solvent such as chloroform and carbon tetrachloride, the mol ratio of solvent to trifluorochloroethylene is generally in the range of 9:1 to 1:3. A more detailed description of the polymerization of trifluorochloroethylene in the presence of a chain transfer solvent can be found in U. S. Patent No. 2,700,661, issued January 25, 1955.

When homotelomerizing trifluorochloroethylene in the presence of a telogen such as sulfuryl chloride, the mol ratio of telogen to trifluorochloroethylene employed is between about 2:1 and about 1:10, preferably between about 1:1 and 1:4. In a specific example, 3.5 parts of benzoyl peroxide are dissolved in 308 parts of carbon tetrachloride and 135 parts of sulfuryl chloride. Trifluorochloroethylene monomer (116 parts) is added and the system is heated to about 95° C. for a period of four hours with agitation to produce a high yield of relatively low molecular weight polymers in the oil and wax range. These low molecular weight polymers may be separated by distillation at subatmospheric pressures into fractions boiling between about 95° C. and about 245° C. at 1 mm. mercury pressure, the preferred fractions being the normally liquid fractions boiling between about 132° C. and about 208° C. at 1 mm. mercury pressure. A more detailed description of homotelomerization with sulfuryl halides may be found in the copending application of W. S. Barnhart, Serial No. 294,495, filed June 19, 1952. It has been found that the telomerization reaction is aided by the presence of sulfur dioxide as a modifying agent as more fully described in the copending application of W. S. Barnhart, Serial Number 342,743, filed March 16, 1953.

Liquid and soft waxy cotelomer products of trifluorochloroethylene are also useful as the halogenated constituent of the composition of the present invention. The cotelomer products such as those obtained by cotelomerizing trifluorochloroethylene with vinylidene fluoride in the presence of sulfuryl chloride, are obtained under essentially the same conditions as above-described for the homotelomerization of trifluorochloroethylene in the presence of sulfuryl chloride.

The homo and cotelomer products of trifluorochloroethylene obtained by the above-mentioned procedures contain only compounds having an even number of carbon atoms, which compounds are saturated, have a chlorine end group and molecular weights below about 5,000.

The polymers of trifluorochloroethylene prepared by the above-mentioned procedures are distillable products ranging from volatile liquids to hard brittle waxes. The products are distilled at subatmospheric pressures to prevent any decomposition of the products.

Table I lists the various physical properties of the preferred types of halogenated oils and wax obtained by the homotelomerization of trifluorochloroethylene in the presence of sulfuryl chloride, which may be used as one constituent of the composition of the present invention.

TABLE I

*Sulfuryl chloride—trifluorochloroethylene telomer products*

| Fractions | 1 | 2 | 3 |
|---|---|---|---|
| Average molecular weight | 630 | 780 | 940 |
| Boiling range, ° C., at 1 mm. Hg | 95-132 | 132-208 | 208-245 |
| Melting point, ° C. | | | 40 |
| Viscosity, centistokes, 210° F. | 3 | 10 | 40 |
| Pour point, ° F. | −45 | +30 | +90 |
| Density, 160° F. | 1.85 | 1.88 | 1.92 |

Table II lists the various physical properties of the preferred types of fluorinated thermally cracked materials of high molecular weight polytrifluorochloroethylene which are used as one constituent of the composition of the present invention. The fractions listed in Table II were obtained by fluorinating the thermally cracked material with cobalt trifluoride.

TABLE II

*Fluorinated thermally cracked products of solid polytrifluorochloroethylene*

| Fractions | 1 | 2 | 3 |
|---|---|---|---|
| Average molecular weight | 640 | 790 | 990 |
| Boiling range, ° C., at 1 mm. Hg | 110-140 | 140-200 | 200-230 |
| Melting point, ° C. | | | 30 |
| Viscosity, centistokes, 210° F. | ¹4.2 | 4.7 | 17.3 |
| Pour point, ° F. | Below −35 | −10 | +65 |
| Density, 160° F. | 1.822 | 1.861 | 1.907 |

¹ Viscosity at 130° F.

The preferred types of polymers of trifluorochloroethylene which are used in the present invention may be any one of the individual fractions listed in Table I and Table II or they may be mixtures or admixtures of any of the listed fractions, or they may be intermediate fractions and mixtures thereof. It is to be understood that the boiling ranges listed in Table I and Table II were determined by reading the temperature of the vapor during distillation and that these boiling points may vary from one distillation to another depending upon the size of the distillation flask and other variable conditions concomitant with distillation at subatmospheric pressure.

As above mentioned, a wax base having a melting point of at least 60° C., which is preferably a hard wax base, is employed as a second component of the composition of the present invention. The hard wax base as defined herein has an Asphalt Needle Penetration Value of less than 0.1 centimeter, and preferably an Asphalt Needle Penetration Value of less than 0.05 centimeter. Although the wax base may be a wax having a melting point as high as 200° C., it is preferable to employ a wax having a melting point below 150° C. Of such waxes, the preferred types are the natural vegetable waxes and oxidized microcrystalline petroleum wax. Polymers of trifluorochloroethylene have been found to be incompatible or immiscible with such waxes, the advantages of such incompatibility having been discussed hereinabove.

Typical examples of suitable natural waxes which may be employed in accordance with the present invention are listed in Table III wherein the asphalt needle penetration values were obtained using a standard penetrometer needle, a 100 gram total load and a penetration time of 5 seconds at 25° C.

TABLE III

| Natural Wax | Melting point, ° C. | Asphalt needle penetration value in centimeters |
|---|---|---|
| Carnauba wax | 83 −86 | 0.01 |
| Ouricuri wax, filtered double refined | 79 | 0.01 |
| Candelilla wax | 75.8−77.4 | 0.015 |
| Esparto wax | 75 −78 | 0.015 |
| Sugar cane wax, Louisiana refined | 77.8 | 0.02 |
| Douglas fir wax | 71 | 0.01 |
| Montan wax, crude | 78 −85 | |
| Montan wax, bleached | 70 −85 | 0.01 |
| Beeswax, white U. S. P. | 64.7 | 0.01 |
| Ozocerite, commercial | 61 −78 | 0.13 |
| Ceresin, Italian white | 70 | 0.14 |
| Microcrystalline petroleum wax "Petrosene A" | 70 | 0.2 |

Oxidized microcrystalline petroleum wax is a very desirable wax constituent of the polish composition of the present invention inasmuch as it is considerably less costly than the natural waxes having comparable rubbing characteristics. It is prepared by blowing microcrystalline petroleum wax with air in the presence of an oxidizing catalyst such as cobalt salts or salts of other metals such as manganese, iron and copper. Such a wax has a melting point of 85° C. to 88° C. and an asphalt needle penetration value of less than 0.04 cm.

In a preferred embodiment of the present invention a hard wax is used as the primary wax base component inasmuch as the hard wax is more resistant to wear, scuff, dirt and smear than softer waxes. Therefore, according to the definition of a hard wax given hereinabove, of the above-mentioned non-halogenated wax components, oxidized microcrystalline petroleum wax, carnauba wax, candelilla wax, esparto wax and Douglas fir wax are typical examples of the preferred non-halogenated hard wax base component of the composition of the present invention. It is to be understood, however, that satisfactory results are obtained when any of the waxes mentioned in Table III, as well as other waxes having comparable properties, are used in accordance with the present invention. It is to be understood that any one of these waxes may be used in admixture. The softer waxes, or those having an asphalt needle penetration value between about 0.1 centimeter and 0.5 centimeter are preferably employed in admixture with the hard wax. This is sometimes done to lower the cost of a more expensive type of hard wax. It is also within the scope of the present invention to use, in addition to the wax bases mentioned above, a wax of trifluorochloroethylene having a melting point between about 50° C. and about 110° C. Such waxes are obtained by the same procedures described above for the preparation of liquid and lower melting waxes of trifluorochloroethylene. The addition of small amounts of such fluorine-containing waxes increases the water repellent properties and heat stability of the polishes of the present invention.

As stated above, the liquid and soft waxy polymeric component and the wax base component may be used in admixture without the addition of a solvent or thinner. However, it is easier to obtain a homogeneous blend of components when an organic liquid is employed as a solvent or diluent. The organic liquid is preferably one in which the non-halogenated wax component is soluble at elevated temperatures. In general, these solvents are aliphatic and aromatic fractions boiling between about 100° C. and 300° C. and include aromatic petroleum fractions, naphtha and mineral spirits and other solvents which are reasonably volatile, that is, which completely evaporate in less than about 10 minutes. Typical examples of such solvents are Solvesso 100 boiling between about 150° C. and 180° C., Solvesso 150 boiling between about 180° C. and 215° C., naphthol mineral spirits boiling between about 140° and 170° C., turpentine, kerosene and spindle oil. The Solvesso type solvents are distillates of aromatic hydrocarbons comprising xylene, trimethyl benzene and closely related alkylated benzenes. Various thinners may also be employed, such as benzene, lower boiling petroleum fractions, and lacquer thinners such as acetone, methyl ethyl ketone, ethyl acetate and other relatively volatile ketones and esters.

The organic solvent is used in an amount between about 3 percent and about 98 percent by weight. The lower concentrations of solvent, for example, between about 3 percent and about 20 percent by weight, are employed when preparing an aqueous emulsion polish of the oil-in-water type. Between about 10 percent and about 75 percent by weight of solvent is used in the preparation of paste polishes and between about 50 percent and about 98 percent by weight of solvent is used in the preparation of liquid types of polishes of the non-aqueous emulsion type.

It is within the scope of the present invention to incorporate into the wax-containing compositions of the present invention a resinous material which is compatible with or at least partially miscible in the wax ingredients of the polish. Typical examples of resins which may be employed are natural resins such as rosins, ester gums, modified rosin, shellac, kauri, and dammar; and synthetic types of resins such as phenolformaldehyde condensation resins (Durez resins), urea-formaldehyde condensation resins (Plaskon), melamine-formaldehyde condensation resins (Melmac) and alkyd resins obtained by esterification of polyhydric alcohols such as glycerin or ethylene glycol, with polybasic acids or anhydrides and are, for example, phthalic alkyd and maleic alkyd resins. The concentration of resin which may be used ranges between about 0.5 percent and 10 percent by weight and preferably between about 1.0 percent and 5 percent by weight. The resin ingredient is used as a diluent for the wax component and in some instances it improves the rubbing characteristics and hardness of the polish composition. The compositions of the present invention which contain a resinous material of the types above-described are particularly useful as wood polishes and for water-proofing paper and fabric surfaces.

As above mentioned, the compositions of the present invention may be prepared as aqueous emulsions of the oil-in-water type and may be prepared with or without addition of the above-mentioned organic solvents. The emulsifying agents which may be employed to emulsify the wax component include morpholine salts of fatty acids wherein the fatty acids contain from 12 to 18 carbon atoms and are, for example, morpholine oleate and morpholine stearate; acetates of n-primary amines having from 12 to 18 carbon atoms in the amino group and are, for example, n-dodecylamine acetate and n-octadecylamine acetate; petroleum sulfonates having between 12 and 20 carbon atoms; and bentonite. These emulsifying agents are generally used in an amount between about 0.2 percent and about 5 percent by weight. An excess of emulsifier must be avoided in order to prevent a dull finish and poor water resistance. Water comprises between about 50 percent and 75 percent by weight of these emulsions. The composition of the present invention when used in emulsion is principally used to polish automobile surfaces coated with pigmented nitrocellulose lacquers and the like, and need not be completely removed when the automobile body is to be repainted.

It is also within the scope of the present invention to include mild abrasives as ingredients of the presently described composition. Such abrasives are added in order to obtain improved cleaning characteristics of the compositions of the present invention when such compositions are employed as polishes. These abrasives are utilized in a range of from about 5 percent to about 15 percent by weight. Some particular abrasives that can be used are diatomaceous earth, silica, talc, rouge and tripoli. Other ingredients which may be added without departing from the scope of this invention include coloring matter (inorganic pigments and organic dyes), and odorants such as dipentene or dihydrin.

The compositions of the present invention are prepared by dissolving the non-halogenated wax base component in a portion of the organic solvent at a temperature which is at least the same as the melting point of the wax and which is preferably about 25° C. above the melting point of the wax. The wax solution is then cooled slowly to a temperature which is approximately 20° C. above or below the melting point of the wax, followed by the addition with stirring of the normally liquid or soft waxy polymer of trifluorochloroethylene. If an emulsifier is used, it is next added to this warm mixture followed by the addition and dispersion of other ingredients such as hot water, resins, abrasives, coloring matter and odorants. The entire mixture is heated and stirred until smooth and free of lumps, and is then cooled slowly to room temperature. When a solvent is not employed, the wax base is melted and the polymer of trifluorochloroethylene and other ingredients are added with stirring to the melted wax. The mixture is stirred until a smooth, homogeneous blend of the ingredients is obtained.

The following formulations are offered as a better understanding of the present invention and how the compositions are made and are not to be construed as unnecessarily limiting the scope of the present invention.

*Example 1*

Components: Percent by weight
Oxidized microcrystalline petroleum wax (Cardis 314 wax) _____ 1.5
Phenol-formaldehyde resin (Durez 219)[1]_____ 1.5
Fluoinated material of thermally cracked polytrifluorochloroethylene (Fraction 1 of Table II) _____ 1.0
  Kinematic viscosity at 130° F. is 4.2 centistokes.
  Density at 160° F. is 1.822.
Solvesso 100 (A mixture of aromatic hydrocarbons comprising xylene, trimethylbenzene and closely related benzenes having a boiling point range of 150° C. to 180° C. _____ 96.0

[1] A non-heat advancing, oil-soluble terpene modified phenol-formaldehyde resin product of Durez Plastics and Chemicals, Inc.

The wax was dissolved in ten parts by weight of solvent at a temperature of 100° C. in a steam jacketed kettle. The solution was cooled slowly for 1 hour to 50° C. with intermittent agitation. The other ingredients and rest of the solvent were then added with stirring to produce the resultant liquid wax polish.

A varnished tabletop was polished with this polish composition by applying the polish with a cloth, allowing the solvent to evaporate, and then wiping the surface with a soft cloth. A glossy, smooth and non-sticky surface wax obtained which was not wetted by water and did not spot when water was applied.

*Example 2*

Components: Percent by weight
Oxidized microcrystalline petroleum wax (Cardis) 314 wax _____ 2.5
Fluorinated material of thermally cracked polytrifluorochloroethylene (Fraction 2 of Table II) _____ 1.0
  Kinematic viscosity at 210° F. is 4.7 centistokes.
  Density at 160° F. is 1.861.
Solvesso 100 (A mixture of aromatic hydrocarbons comprising xylene, trimethylbenzene and closely related benzenes having a boiling range of 150° C. to 180° C.) _____ 96.0

This polish was prepared as described following the procedure of Example 1 with the exception that no resin was added.

It is also within the scope of the present invention to add to the compositions described herein a halogen substituted ethane having a boiling point below −10° C. such as 1,1,2-trifluorotrichloroethane, and to store the composition under pressure in a suitable container so that the composition may be discharged from the container and applied to a surface in the form of a spray.

It is to be understood that the invention includes within its scope the use, as one component of the composition of the present invention, of low molecular weight polymers of perhalogenated olefins in general. Other various modifications and alterations of the composition of the present invention, and of the method for preparing such a composition, may become apparent to those skilled in the art without departing from the scope of this invention.

I claim:

1. A composition comprising an admixture of a hard wax component selected from the group consisting of natural waxes and oxidized microcrystalline petroleum wax, and a low molecular weight polymer of trifluorochloroethylene selected from the group consisting of the normally liquid polymers of trifluorochloroethylene and the waxy polymers of trifluorochloroethylene which melt at temperatures lower than about 40° C., the weight ratio of said polymer to said wax being from about 1:10 to about 10:1.

2. A composition comprising an admixture of Douglas fir wax and a low molecular weight polymer of trifluorochloroethylene selected from the group consisting of the normally liquid polymers of trifluorochloroethylene and the waxy polymers of trifluorochloroethylene which melt at temperatures lower than about 40° C., the weight ratio of said polymer to said wax being from about 1:10 to about 10:1.

3. A composition comprising an admixture of montan wax and a low molecular weight polymer of trifluorochloroethylene selected from the group consisting of the normally liquid polymers of trifluorochloroethylene and the waxy polymers of trifluorochloroethylene which melt at temperatures lower than about 40° C., the weight ratio of said polymer to said wax being from about 1:10 to about 10:1.

4. A composition comprising an admixture of carnauba wax and a low molecular weight polymer of trifluorochloroethylene selected from the group consisting of the normally liquid polymers of trifluorochloroethylene and the waxy polymers of trifluorochloroethylene which melt at temperatures lower than about 40° C., the weight ratio of said polymer to said wax being from about 1:10 to about 10:1.

5. A composition comprising an admixture of candelilla wax and a low molecular weight polymer of trifluorochloroethylene selected from the group consisting of the normally liquid polymers of trifluorochloroethylene and the waxy polymers of trifluorochloroethylene which melt at temperatures lower than about 40° C., the weight ratio of said polymer to said wax being from about 1:10 to about 10:1.

6. A composition comprising an admixture of a hard wax component having a melting point of at least 60° C. selected from the group consisting of natural waxes and oxidized microcrystalline petroleum wax, and a low molecular weight normally liquid polymer of trifluorochloroethylene boiling between about 90° C. and about 210° C. at 1 mm. mercury pressure, the weight ratio of said polymer to said wax being from about 1:10 to about 10:1.

7. A composition comprising an admixture of a hard wax component having a melting point of at least 60° C. selected from the group consisting of natural waxes and oxidized microcrystalline petroleum wax, and a low molecular weight normally waxy polymer of trifluorochloroethylene having a melting point between about 30° C. and about 40° C., the weight ratio of said polymer to said wax being from about 1:10 to about 10:1.

8. A composition comprising an admixture of a hard wax component having a melting point of at least 60° C. selected from the group consisting of natural waxes and oxidized microcrystalline petroleum wax, and a low molecular weight polymer of trifluorochloroethylene selected from the group consisting of the normally liquid polymers of trifluorochloroethylene and the waxy polymers of trifluorochloroethylene which melt at temperatures lower than about 40° C., the weight ratio of said polymer to said wax being from about 1:10 to about 10:1, and a normally liquid organic solvent component in which said wax is soluble at elevated temperatures.

9. A composition comprising an admixture of a hard wax component having a melting point of at least 60° C. selected from the group consisting of natural waxes and oxidized microcrystalline petroleum wax, and a low molecular weight polymer of trifluorochloroethylene selected from the group consisting of the normally liquid polymers of trifluorochloroethylene and the waxy polymers of trifluorochloroethylene which melt at temperatures lower than about 40° C., the weight ratio of said polymer to said wax being from about 1:10 to about 10:1, and an organic solvent component boiling between about 100° C. and 300° C. in which said wax is soluble at elevated temperatures.

10. A composition comprising an admixture of a hard wax component having a melting point of at least 60° C. selected from the group consisting of natural waxes and oxidized microcrystalline petroleum wax, and a low molecular weight polymer of trifluorochloroethylene selected from the group consisting of the normally liquid polymers of trifluorochloroethylene and the waxy polymers of trifluorochloroethylene which melt at temperatures lower than about 40° C. in a weight ratio of said polymer to said wax component of between about 1:10 and about 10:1.

11. A polish composition comprising an admixture of a hard wax component having a melting point of at least 60° C. selected from the group consisting of natural waxes and oxidized microcrystalline petroleum wax, and a low molecular weight polymer of trifluorochloroethylene selected from the group consisting of the normally liquid polymers of trifluorochloroethylene and the waxy polymers of trifluorochloroethylene which melt at temperatures lower than about 40° C. in a weight ratio of said polymer to said wax component of between about 1:1 and about 1:10, and at least 3 percent by weight of a normally liquid solvent component in which said wax is soluble at elevated temperatures.

12. A liquid type polish composition comprising an admixture of a hard wax component having a melting point of at least 60° C. selected from the group consisting of natural waxes and oxidized microcrystalline petroleum wax, and a low molecular weight polymer of trifluorochloroethylene selected from the group consisting of the normally liquid polymers of trifluorochloroethylene and the waxy polymers of trifluorochloroethylene which melt at temperatures lower than about 40° C. in a weight ratio of said polymer to said wax component of between about 1:1 and 1:5, and between about 50 percent and about 98 percent by weight of a normally liquid solvent component in which said wax is soluble at elevated temperatures.

13. A paste type polish composition comprising an admixture of a hard wax component having a melting point of at least 60° C. selected from the group consisting of natural waxes and oxidized microcrystalline petroleum wax, and a low molecular weight polymer of trifluorochloroethylene selected from the group consisting of the normally liquid polymers of trifluorochloroethylene and the waxy polymers of trifluorochloroethylene which melt at temperatures lower than about 40° C. in a weight ratio of said polymer to said wax component of between about 1:1 and about 1:5, and between about 10 percent and about 75 percent by weight of an organic solvent component boiling between about 100° C. and about 300° C. and in which said wax is soluble at elevated temperatures.

14. A liquid polish composition consisting of an admixture of oxidized microcrystalline petroleum wax and a low molecular weight polymer of trifluorochloroethylene having a boiling point between about 110° C. and about 140° C. at 1 mm. mercury pressure in a weight ratio of said polymer to wax component of between about 1:1 and 1:5, and at least 50 percent by weight of an aromatic distillate boiling between about 150° C. and about 180° C. and in which said wax is soluble at elevated temperatures.

15. A polish composition comprising an admixture of a hard wax component having a melting point of at least 60° C. selected from the group consisting of natural waxes and oxidized microcrystalline petroleum wax; a low molecular weight polymer of trifluorochloroethylene selected from the group consisting of the normally liquid polymers of trifluorochloroethylene and the waxy polymers of trifluorochloroethylene which melt at temperatures lower than about 40° C.; a hard resinous material at least partly miscible with said wax component and said polymer selected from the group consisting of alkyd resins, formaldehyde condensation resins, and natural resins; and a normally liquid organic solvent component in which said wax is soluble at elevated temperatures, the weight ratio of said polymer to said wax being from about 1:10 to about 10:1.

16. A liquid polish composition comprising an admixture of oxidized microcrystalline petroleum wax and a low molecular weight polymer of trifluorochloroethylene having a boiling point between about 140° C. and about 200° C. at 1 mm. mercury pressure in a weight ratio of said polymer to said wax component of between about 1:1 and 1:5, a phenol-formaldehyde condensation resin at least partly miscible with said wax and said polymer in an amount between about 0.5 and about 10 percent by weight, and at least 50 percent by weight of a normally liquid organic solvent boiling between about 100° C. and about 300° C. and in which said wax is soluble at elevated temperatures.

17. A composition comprising an admixture of a non-halogenated hard wax component having a melting point of at least 60° C., and a low molecular weight polymer of trifluorochloroethylene selected from the group consisting of normally liquid polymers of trifluorochloroethylene and the waxy polymers of trifluorochloroethylene which melt at temperatures below about 40° C., the weight ratio of said polymer to said wax being from about 1:10 to about 10:1.

References Cited in the file of this patent
UNITED STATES PATENTS
2,586,357   Llewellyn _____ Feb. 19, 1952